United States Patent [19]

Foerster

[11] Patent Number: 5,546,076
[45] Date of Patent: Aug. 13, 1996

[54] EARTH-TREMOR-RESPONSIVE LIGHT

[75] Inventor: Roy P. Foerster, Thousand Oaks, Calif.

[73] Assignee: Kalidon Technology, Inc., Camarillo, Calif.

[21] Appl. No.: 467,312

[22] Filed: Jun. 6, 1995

[51] Int. Cl.$^6$ ............................ G08B 13/00; H01H 35/14
[52] U.S. Cl. ...................... 340/690; 200/61.53; 340/540; 340/601; 340/667
[58] Field of Search ..................................... 340/690, 669, 340/601, 540; 200/61.53

[56] References Cited

U.S. PATENT DOCUMENTS

| | | | |
|---|---|---|---|
| 3,812,308 | 5/1974 | Bell et al. | 200/61.45 |
| 4,219,708 | 8/1980 | Rubey | 200/61.47 |
| 4,467,153 | 8/1984 | Jones et al. | 200/61.45 |
| 4,528,559 | 7/1985 | Freeman | 340/690 |
| 4,591,676 | 5/1986 | Jackman et al. | 200/61.45 |
| 4,764,761 | 8/1988 | Maguire, III | 340/690 |
| 4,789,922 | 12/1988 | Cheshire | 362/158 |
| 4,833,281 | 5/1989 | Maples | 200/61.45 |
| 4,841,287 | 6/1989 | Flig et al. | 340/690 |
| 5,001,466 | 3/1991 | Orlinsky et al. | 340/690 |
| 5,119,841 | 6/1992 | McGill | 137/38 |
| 5,149,926 | 9/1992 | Ono | 200/61.45 |
| 5,192,839 | 3/1993 | Imade et al. | 200/61.45 |
| 5,237,135 | 8/1993 | Wolski | 200/61.45 |

*Primary Examiner*—Glen Swann
*Attorney, Agent, or Firm*—Leydig, Voit & Mayer

[57] ABSTRACT

An earth-tremor-responsive light contained in a main housing is described having a back member for mounting against a vertical wall and a light transmitting front cover; a standby battery; a light emitter; electrical circuit elements connecting the battery to the light emitter through an inertial switch which is actuated by acceleration resulting from earth tremors, the inertial switch including a switch chamber having a generally horizontal shallow upwardly-facing conical surface with a central apex at a lower point thereof; a spherical ball urged by gravity to rest in a central disposition on the conical surface; a vertical shaft projecting externally of the main housing and disposed in the chamber aligned with the central apex and above the ball, the shaft being guided for vertical movement in the chamber and having a lower end resting on top of the ball; a spring urging the shaft downwardly to a set position against the ball at rest in its central disposition, whereby a peak acceleration resulting from an earth tremor shaking the switch and exceeding a predetermined magnitude will displace the ball and conical surface relatively horizontally to an extent that the shaft will be urged to drop downwardly from its set position by the spring toward the central apex and thus hold the ball displaced in an offset disposition relative to the central apex of the conical surface; first electrical contact elements carried by the vertical shaft in a first state when the ball is in the central disposition and being shifted to a second state when the ball is displaced to its offset position; and second electrical contact elements engaged by the first contact elements when shifted to their second state to actuate the switch and complete the electrical circuit such that the light emitter is energized, the first electrical contact elements being resettable to the first state by externally lifting the shaft against the spring and allowing the ball to return by gravity to the central disposition, and returning the shaft to its set position.

10 Claims, 3 Drawing Sheets

EARTH-TREMOR-RESPONSIVE LIGHT

TECHNICAL FIELD

This invention relates to devices responsive to motion, in particular, to devices responsive to acceleration caused by motion and finding specific application in earthquake activated lights.

BACKGROUND OF THE INVENTION

Heretofore, inertial switches and acceleration sensors which have been proposed for activating lights used as emergency alarms or safety lights have either been overly complex and costly to manufacture, difficult to calibrate for sensitivity, or difficult to use, for example, awkward to reset.

SUMMARY OF THE INVENTION

The principle object of the present invention is to overcome these disadvantages of prior inertial switches and acceleration sensors and provide an earth-tremor-responsive light which is activated by a reliable inertial switch, the sensitivity of which can be varied by changing one of several of its parameters, which can be easily and quickly reset after it is actuated, and is small, durable and inexpensive being of simple design.

A further object is to provide such an inertial switch which can be constructed to be sensitive enough to be actuated by the accelerations encountered in a moderate earthquake e.g. peak accelerations of approximately 0.4 G; at this level the shake amplitude is sufficient to disturb occupants of a building and may cause interior structural damage while street noises, such as a truck passing, will not cause actuation.

A related object is to provide such an inertial switch which can be pre-set at the time of manufacture to be actuated by peak accelerations within a range of from approximately 0.1 G to 10.0 G, the sensitivity of the switch being determined by changing one or more of several switch parameters.

Another object is to provide such an inertial switch which is passive so that it will not deplete batteries connected to the switch while in the "standby" state.

Another object is to provide such an inertial switch which, when in an electrical battery energized circuit and actuated or tripped, has a very low loss.

Another object is to provide such an inertial switch which, once tripped, locks in the "on" state, regardless of the attitude or other forces on the switch (except for the specific action of resetting).

To achieve these objects, the invention is disclosed embodied in an earth-tremor-responsive light contained in a main housing having a back member for mounting against a vertical wall and a light transmitting front cover; a stand-by battery; a light emitter; electrical circuit elements connecting the battery to the light emitter through an inertial switch which is actuated by acceleration resulting from earth tremors, the inertial switch including a switch chamber having a generally horizontal shallow upwardly-facing conical surface with a central apex at a lower point thereof; a spherical ball urged by gravity to rest in a central disposition on said conical surface; a vertical shaft projecting externally of the main housing and disposed in the chamber aligned with the central apex and above the ball, the shaft being guided for vertical movement in the chamber and having a lower end resting on top of the ball; a spring urging the shaft downwardly to a set position against the ball at rest in its central disposition, whereby a peak acceleration resulting from an earth tremor shaking the switch and exceeding a predetermined magnitude will displace the ball and conical surface relatively horizontally to an extent that the shaft will be urged to drop downwardly from its set position by the spring toward the central apex and thus hold the ball displaced in an offset disposition relative to the central apex of the conical surface; first electrical contact elements carded by the vertical shaft in a first state when the ball is in the central disposition and being shifted to a second state when the ball is displaced to its offset position; and second electrical contact elements engaged by the first contact elements when shifted to their second state to actuate the switch and complete the electrical circuit such that the light emitter is energized, the first electrical contact elements being resettable to the first state by externally lifting the shaft against the spring and allowing the ball to return by gravity to the central disposition, and returning the shaft to its set position.

BRIEF DESCRIPTION OF THE DRAWINGS

Further objects will become apparent as the description proceeds with reference to the drawings, in which.

DESCRIPTION OF THE PREFERRED EMBODIMENTS

Figure 1:
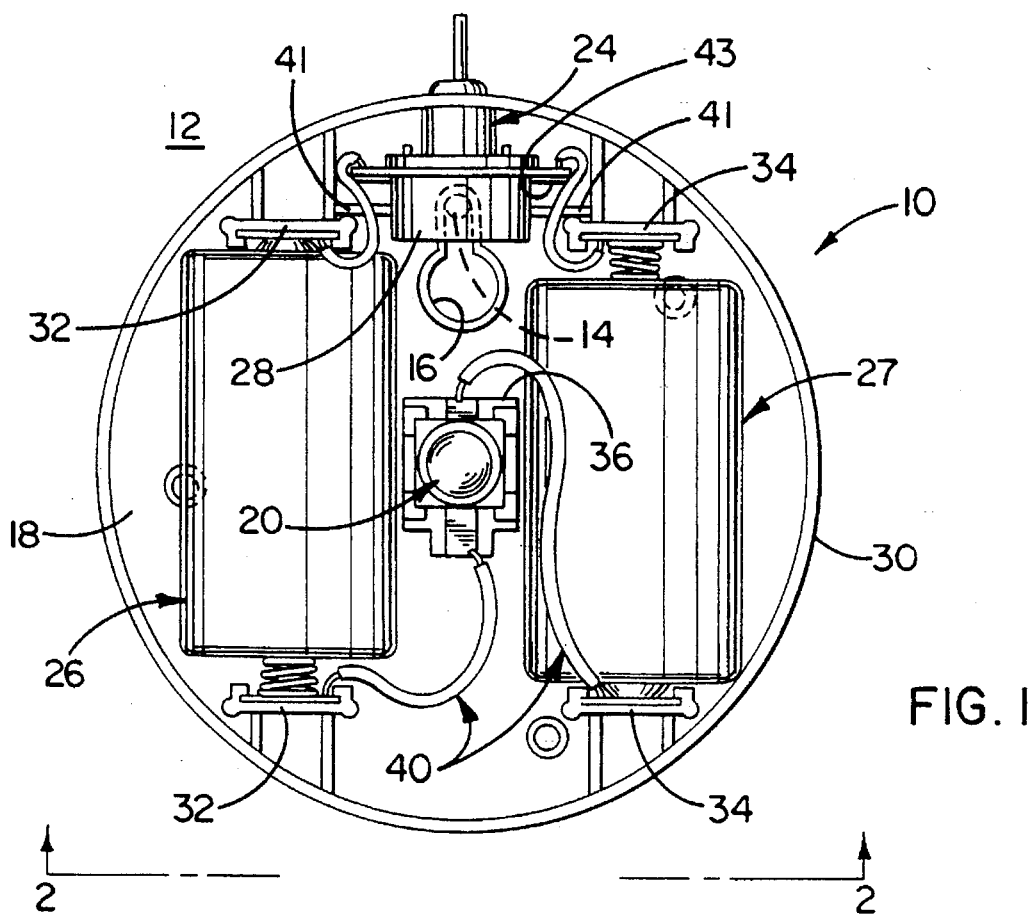
FIG. 1 is a plan view of a tremor-responsive light embodying the invention showing the main housing and most of the internal components and with the cover removed.
Figure 2:
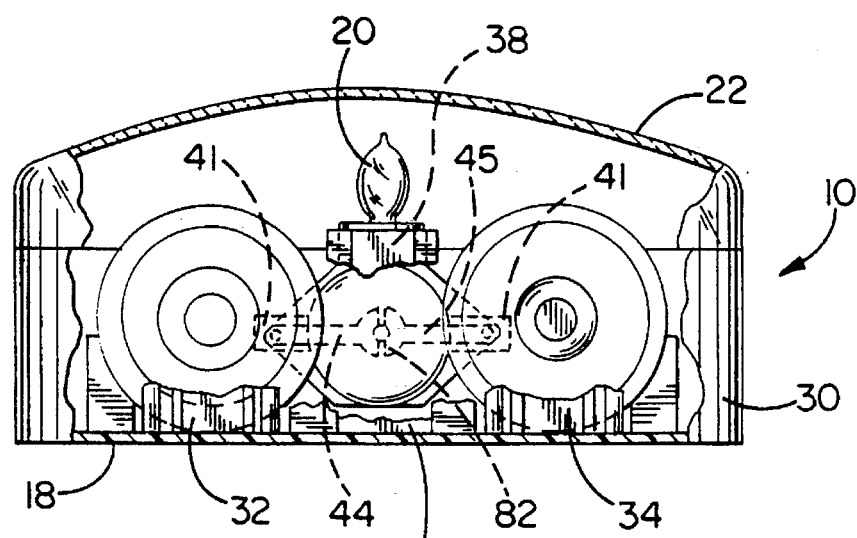
FIG. 2 is a side view of the light shown in FIG. 1 with the cover in place and with portions of a side wall of the main housing, portions of the cover and portions of some other elements partially broken away to reveal components within the main housing.

In its preferred and best mode, an earth-tremor-responsive light according to the invention is shown in FIGS. 1 and 2 and is constructed to be operated with its main housing 10 mounted to a vertical support 12 in the position shown in FIG. 1 on a hook 14 projecting from the support 12 and received in a keyhole-shaped opening 16 provided in the back member 18 of the main housing 10, or on any other supporting arrangement desired. A light emitter in the main housing 10, herein shown as a flashlight bulb 20, when energized from a standby power supply within the main housing 10, emits light through a removable light transmitting cover 22 on the front of the main housing 10 to light the surrounding area.

Referring to FIG. 1, which is a plan view showing the interior of the main housing 10 with its front cover 22 removed, in accordance with the invention an inertial switch 24 is mounted in the main housing 10 and connected in an electrical circuit between the power supply, herein shown as a pair of batteries 26,27, and the light bulb 20. The inertial switch 24 is contained within a switch housing 28 which projects through an opening in the side wall 30 of the main housing 10 at the top thereof when the unit is mounted on a vertical support 12 in its normal operating state. To provide means for supporting the batteries 26,27 and bulb 20 in the main housing 10, it is preferably formed as a molded plastic part with raised interior walls integral with the back member 18 serving as brackets 32,34,36 for holding these components in fixed position within the main housing 10. A socket 38 for the bulb 20 is carried by one of the brackets 36 and each battery 26,27 is carried between a pair of such brackets 32,34, suitable connecting circuitry 40 such as wiring and contact plates being provided to connect opposite terminals of the batteries 26,27 to the bulb socket 38 and to terminals 42,43 of the inertial switch 24 to form an electrical circuit. To fix the switch housing 28 in position, it is held by means such as projecting fingers 41 which are fastened to opposite upper brackets 32,34 for the batteries.

Figure 3:
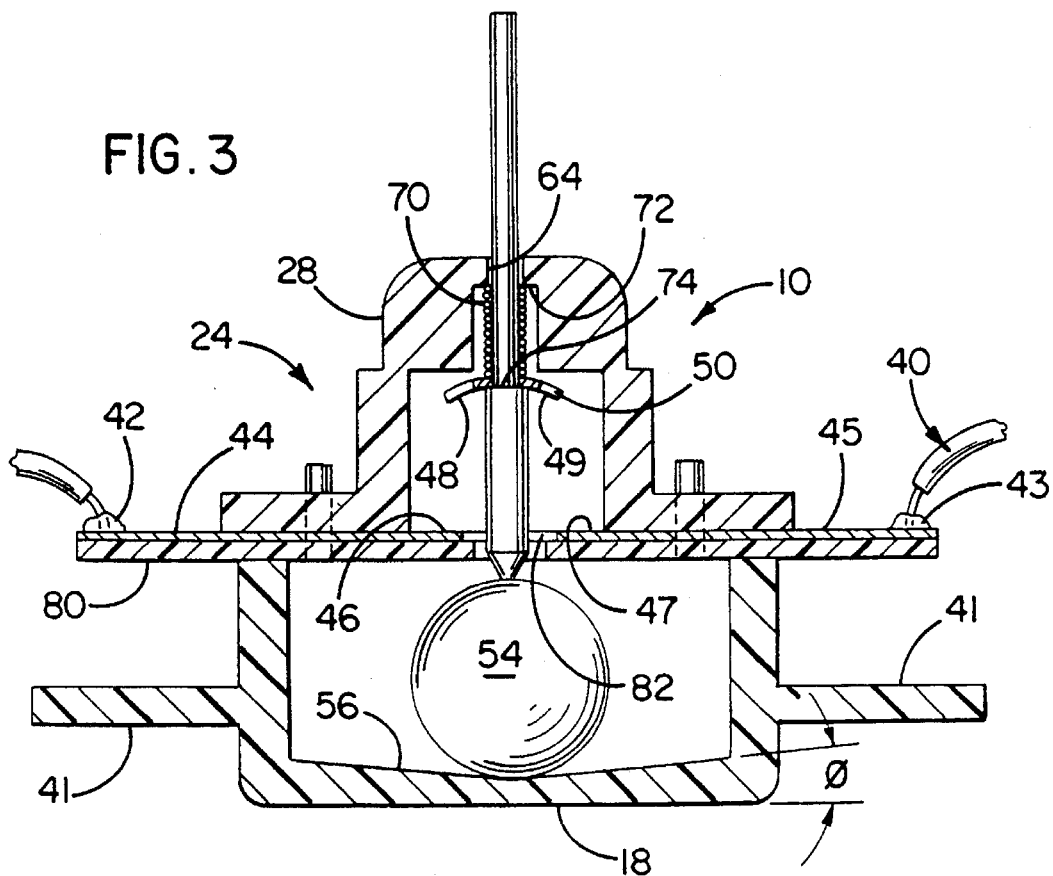
FIG. 3 is an enlarged fragmentary vertical cross-sectional view illustrating the inertial switch component of the light, with the switch in the standby state.
Figure 4:
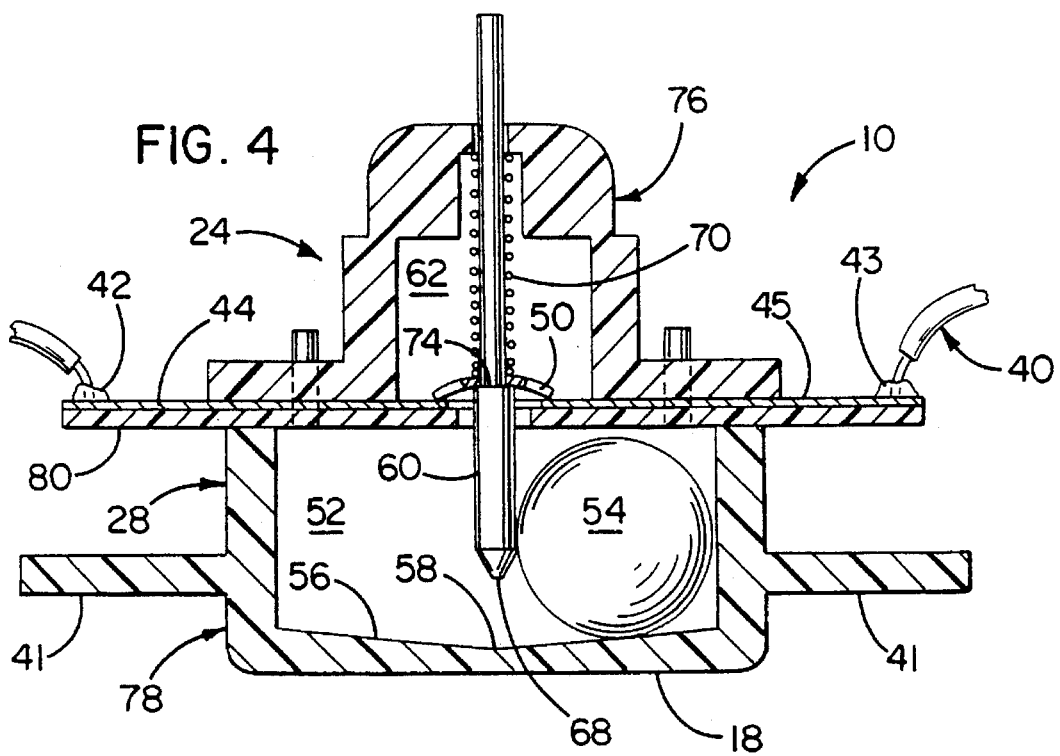
FIG. 4 is an enlarged fragmentary view similar to FIG. 3 illustrating the switch in the tripped state.

In keeping with the invention, the inertial switch 24 is constructed to be actuated or tripped, and thereby complete the electrical circuit and connect the batteries 26,27 to energize the light bulb 20, in response to earth tremors producing accelerations exceeding a predetermined magnitude which shake the light. Referring to FIGS. 3–4, the terminals 42,43 of the switch 24 are connected to foils 44,45 which extend inside the switch housing 28 to a gap and provide spaced fixed contacts 46,47. The foils 44,45 also appear in FIG. 2 which is a view looking up toward the underside of the switch housing 28; to reveal the preferred shape of the foils 44,45, the lower portion of the switch housing 28 has been removed. In the standby state of the switch 24, shown in FIG. 3, movable ;contacts 48,49 carried by a movable contact member 50 are held in a raised position above the fixed contacts 46,47; the movable contacts 48,49 drop and bridge the fixed contacts 46,47 when the switch 24 is tripped as shown in FIG. 4.

For tripping the switch 24 responsive to accelerations, the interior of the switch housing 28 is formed with a lower chamber 52 which contains a spherical ball 54, herein shown as a steel ball bearing, the lower chamber 52 having a generally horizontal shallow upwardly-facing conical surface 56 having a central apex 58 at a lower point to which the ball 54 is urged by gravity to rest. The axis of the conical surface 56 is vertical. A vertical shaft 60 is disposed in an upper chamber 62 of the switch housing 28 aligned with the apex 58 and above the ball 54, the shaft 60 sliding freely in a vertical guide hole 64 in the top wall of the switch housing 28 and guided therein for vertical movement. The movable contacts 48,49 carried by the contact member 50 are maintained by the shaft 60 in the standby or first state, spaced from the fixed contacts 46,47 as shown in FIG. 3, when the shaft 60 is in a raised position with its lower pointed end 68 resting on top of the ball 54. A coil spring 70 is assembled around the shaft 60 and seats at its upper end against a shoulder 72 or the like within the guide hole 64 in the switch housing 28 and at its lower end is retained against the contact member 50 which preferably fits loosely on the shaft 60 so that it is free to wobble while still retaining the spring 70. The contact member 50 is held on the shaft 60 by a raised shoulder 74 or the like with the desired loose fit and preferably is a tripod element providing the movable contacts 48, 49 allowing it to compensate for considerable variations in itself and the foils 44,45 which provide the fixed contacts 46,47 which it engages. The spring 70 is compressed between the contact member 50 and the shoulder 72 in the guide hole 64 when the shaft 60 is in the raised position shown in FIG. 3 and urges the shaft 60 downwardly to a set position against the ball 54 at rest in its central disposition on the conical surface 56 as shown.

To provide the upper and lower chambers 62,52 of the switch housing 28 and to support the foils 44,45, the switch housing 28 is constructed of upper and lower, bowl shaped, molded plastic parts which are fastened to an intermediate flat plastic plate 80 on the upper surface of which the foils 44,45 are fastened. The upper bowl shaped part 76 is inverted and fastened at its rim also to the upper surface of the intermediate plate 80 to provide the upper chamber 62 and the lower part 78 is upright and fastened at its upper rim to the undersurface of the plate 80. The center of the plate 80 has an opening for the shaft 60 and the foils 44,45 are separated by a gap 82 which is adjacent the opening.

In carrying out the invention, a peak acceleration resulting from an earth tremor and exceeding a predetermined magnitude will displace the switch assembly horizontally while inertia tends to cause the ball to remain stationary. This will tend to cause the ball 54 to slip from under the pointed end 68 of the shaft 60 and from its central disposition and the shaft will be urged by the spring 70 to drop downwardly from its set position toward the apex 58 of the conical surface, as shown in FIG. 4, and thus hold the ball 54 displaced in an offset disposition as shown. The movable contacts 48,49 carried in the first or standby state when the ball 54 is in its central disposition, as shown in FIG. 3, are shifted to a second or "on" state, shown in FIG. 4, when the ball 54 is displaced to its offset position, engaging the fixed contacts 46,47 to actuate the switch 24 and complete the electrical circuit such that the light bulb 20 is energized by the batteries 26,27.

In keeping with a major aspect of the invention, after the switch 24 has been tripped it may be quickly and easily re-set by externally lifting the shaft 60 against the compressive force of the spring 70 so that its lower pointed end 68 is above the ball 54 and allowing the ball 54 to return by gravity without interference to its central disposition. With a working unit, the user is instructed to follow a re-set procedure involving the steps of gripping the exposed upper end of the shaft 60 and lifting it a distance that clears the ball 54 and then holding it in this position for a period of about ten seconds; during this period the ball 54 is allowed to roll to a position of rest. The next step involves releasing the shaft 60 so that it can drop very slightly into place resting on top of the ball 54. When the shaft 60 is lifted, the movable contacts 48,49 are separated from the fixed contacts 46,47 and the switch 24 is deactuated. If in the resetting procedure the bulb 20 is illuminated, which can occur if the ball 54 has not been allowed to come fully to rest and does not support the shaft 60 in its raised position, the user is instructed to repeat the steps of the re-set procedure until the shaft 60 drops into place on top of the ball 54 in its set position which is evident because the bulb 20 does not become illuminated. To test the unit after re-set, or at any time when in the standby state, the user is instructed to remove the unit from its support 12 and to shake the unit gently to trip the switch 24 and illuminate the bulb 20. If desired, circuit elements may also be included to test the circuit without tripping the inertial switch.

In carrying out the invention, the sensitivity of the inertial switch 24 can be varied at the time of manufacture such that it will be actuated and the light bulb 20 energized responsive to a peak acceleration of between about 0.1 G to about 10.0 G, which is predetermined by setting certain parameters of the switch 24.

In its preferred construction, the chamber 52, ball 54 and shaft 60 of the switch 24 are round; therefore, the switch 24 is not directional and a lateral acceleration in any direction exceeding a given magnitude will trip the switch. To facilitate an explanation of how to set parameters of the switch so that it will trip at a predetermined magnitude of acceleration, reference is made to the diagram and chart shown in FIGS. 5a and 5b. Lateral acceleration required to trip the switch 24 is approximated by the following formula:

G=tan $\phi$(1+R/W) where R=force exerted by compressed spring $\phi$=angle of conical surface (FIG. 3)

W=mass of ball

From the foregoing it will be seen that one or more of three parameters can be set to establish a predetermined magnitude of peak acceleration at which the switch will trip and, hence, its sensitivity: increasing (1) spring force R or (2) angle of the conical surface $\phi$ decreases sensitivity; increasing (3) weight W of the ball increases sensitivity.

Figure 5A:
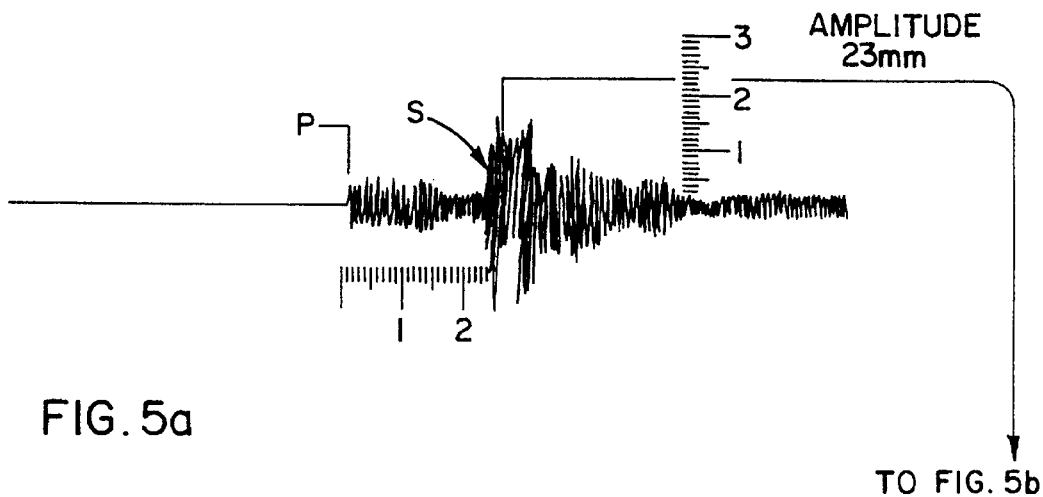
FIG. 5a is a an illustrative amplitude diagram recorded by a seismometer.
Figure 5B:
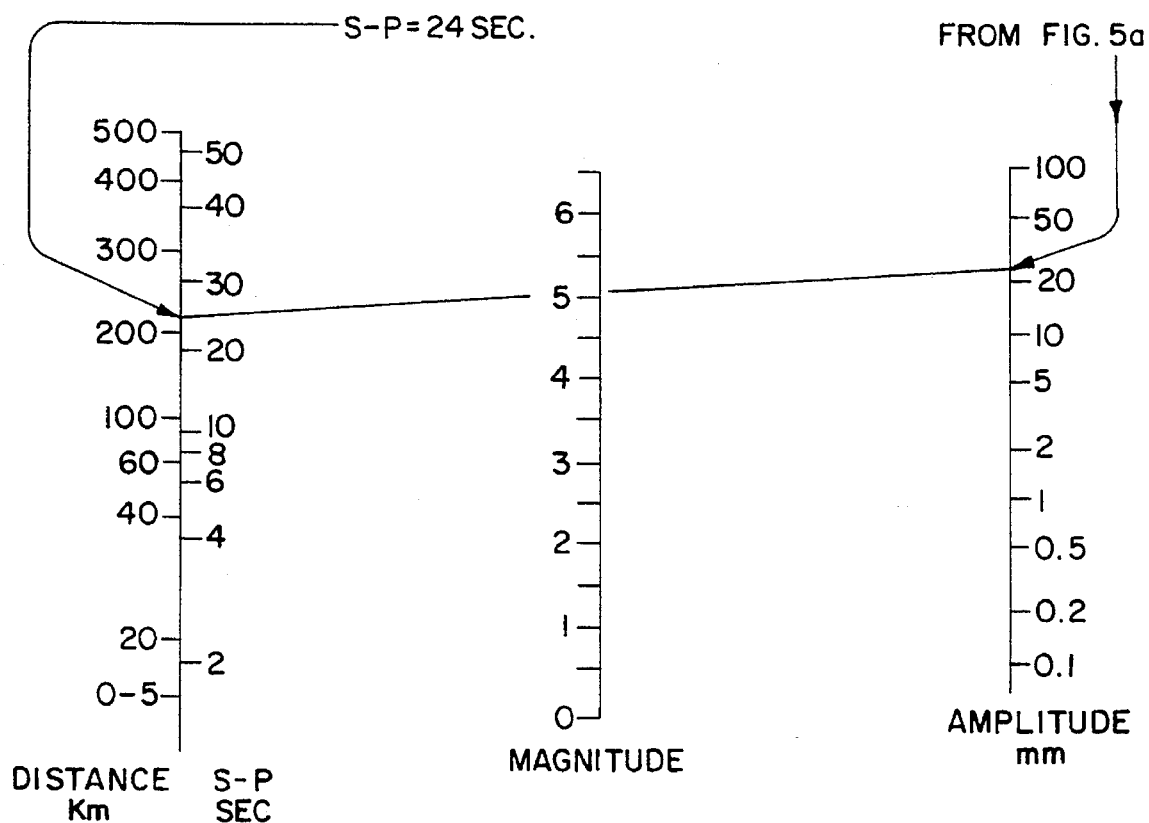
FIG. 5b is a chart containing the Richter Scale from which the magnitude of an earthquake can be determined from the center scale on the chart given the maximum amplitude recorded as shown in FIG. 5a, and the distance of the recording seismometer from the epicenter of the earthquake (or the difference in times of arrival of the P and S waves), and which is used for establishing parameters of the inertial switch of this invention such that it will trip at pre-set accelerations produced by earthquakes of given magnitudes on the Richter Scale.

In its most preferred embodiment, the switch 24 has been constructed such that it will respond to and be tripped at peak accelerations of about 0.4 G. This level was determined by the following analysis. Referring to FIGS. 5a and 5b, a seismometer recording is illustrated in FIG. 5a resulting from an earthquake which occurred at an epicenter a known distance (135 miles) from the recording seismometer. To determine the magnitude of the earthquake on the "Richter Scale" the chart in FIG. 5b is referenced. On the chart of FIG. 5b, the magnitude of the earthquake is shown on the vertical center scale. To determine the magnitude for a given recorded event:

1. The peak shake amplitude of 23 mm (i.e. about 1 inch, as measured on the seismometer recording of FIG. 5a) is located on the right-hand vertical "Amplitude" scale;

2. The distance of the recording seismometer from the epicenter of the earthquake in km (corresponding to 135 miles; or the difference in times of arrival of the P and S waves as measured on the seismometer recording of FIG. 5a may be used) is located on the left-hand vertical "Distance" scale;

3. A straight line is drawn connecting these locations on the left-hand and right-hand scales, which crosses the center scale at the determined magnitude.

For the recorded event described, the Chart of FIG. 5b indicates a 5.0 Richter Scale reading. At this, which is considered a moderate earthquake level:

1. The shake amplitude is sufficient to substantially disturb building occupants and may cause interior structural damage 2. Street noises such as a truck passing will not effect actuation. In its most preferred mode, the invention was embodied in a working unit constructed with a design objective of responding to peak accelerations resulting from such a moderate level earthquake of 5.0 on the Richter Scale. To calculate such peak accelerations, the shake frequency is determined from the seismometer recording; in the illustrated recording shake frequency is two cycles per second.

$X''$ (peak acceleration) =

Amplitude $\times w^2$ where $w = 2 \times \Pi \times$ shake frequency = 12.6

-continued $X'' = (12.6)^2 \times 1/12$
    = 13.2 feet/second/second
    = 0.4 G After experimenting by changing different ones of the parameters, for a working unit which would be tripped by a quake induced acceleration of about 0.4 G the angle of six degrees was selected for the angle of the conical surface 0, a spring with a rate of 0.015 #/inch was selected for the spring, and a 5/16 inch diameter steel ball bearing was selected for the ball which weighed approximately 0.1 oz.

Substituting the above values in the equation G=tan $\phi$(1+R/W):

W=0.1 oz. (the weight of the ball)

R=0.015 #/in. (the spring constant)×16 (to convert the ounces)×0.5" (the amount of compression of the spring when set)=0.12 oz.

Tan$\phi$=0.105 (the tangent of 6 degrees)

G=—0.231

There is some friction in the switch, which adds about 0.1 G to the sensitivity calculation. This sets the lower limit to the possible sensitivity and reduces the sensitivity to an actual value of about 0.33 G such that the working unit is tripped by a tremor induced acceleration of about 0.4 G.

While the foregoing description of the preferred embodiment constitutes the best mode of the invention, it will be appreciated that the invention is open to modification and changes without departing from its scope as set forth in the claims.

I claim:

1. An earth-tremor-responsive light comprising:

a housing having a back member for mounting against a vertical wall and a light transmitting front cover, a stand-by battery in the housing, a light emitter in the housing, and electrical circuit elements in the housing connecting the battery to the light emitter through an inertial switch which is actuated by acceleration resulting from earth tremors, the inertial switch including a switch chamber in the housing having a generally horizontal shallow upwardly-facing conical surface with a central apex at a lower point thereof;

a spherical ball urged by gravity to rest in a central disposition on said conical surface, a vertical shaft projecting externally of the housing and disposed in the chamber aligned with the central apex and above the ball, the shaft being guided for vertical movement in the chamber and having a lower end resting on top of the ball, a spring urging the shaft downwardly to a set position against the ball at rest in its central disposition, whereby a peak acceleration resulting from an earth tremor shaking the housing and exceeding a predetermined magnitude will displace the ball and conical surface relatively horizontally to an extent that the shaft will be urged to drop downwardly from its set position by the spring toward the central apex and thus hold the ball displaced in an offset disposition relative to the central apex of the conical surface, and electrical contact elements manifesting a first state when the ball is in the central disposition and shifted to a second state thereby actuating the switch and energizing the light emitter when the ball is displaced to the offset disposition, the contact elements being resettable to the first state and deenergizing the light emitter by externally lifting the shaft against the spring and allowing the ball to return by gravity to the central disposition, and returning the shaft to its set position.

2. An earth-tremor-responsive light according to claim 1 wherein the switch is actuated and the light emitter is energized responsive to a peak acceleration of between about 0.1 to about 10.0 G, which is pre-set in accordance with the conical surface angle from the horizontal, weight of the ball and the force of the spring.

3. An earth-tremor-responsive light according to claim 2 wherein the conical surface angle is about 6 degrees from the horizontal, the ball comprises a 5/16 inch steel ball bearing, and the spring has a spring rate of about 0.015 #/inch.

4. An earth-tremor-responsive light according to claim 1 wherein the switch is actuated responsive to a peak acceleration of about 0.4 G.

5. An earth-tremor-responsive light comprising an inertial switch, a stand-by battery, a light emitter, and an electrical circuit connecting the battery to the light emitter through the switch, the switch having

- a chamber with a generally horizontal shallow upwardly-facing conical surface having a central apex at a lower point thereof;
- a spherical ball urged by gravity to rest in a central disposition on said conical surface,
- a vertical shaft disposed in the chamber aligned with the central apex and above the ball, the shaft being guided for vertical movement in the chamber and having a lower end resting on top of the ball,
- a spring urging the shaft downwardly to a set position on top of the ball at rest in its central disposition,
- whereby a peak acceleration exceeding a predetermined magnitude will displace the ball and conical surface relatively horizontally to an extent that the shaft will be urged by the spring to drop downwardly from its set position toward the central apex and thus hold the ball displaced in an offset disposition relative to the central apex of the conical surface,
- first electrical contact elements carried by the vertical shaft in a first state when the ball is in the central disposition and being shifted to a second state when the ball is displaced to its offset position, and
- second electrical contact elements engaged by the first contact elements when shifted to their second state to actuate the switch and complete the electrical circuit such that the light emitter is energized,
- the first electrical contact elements being resettable to the first state by externally lifting the shaft against the spring and allowing the ball to return by gravity to the central disposition, and returning the shaft to its set position.

6. An earth-tremor-responsive light according to claim 5 wherein the first contact elements are provided by a tripod-shaped member loosely fitting on the vertical shaft and the second contact elements are provided by fixed, spaced, contact foils which are bridged by the tripod-shaped member to actuate the switch and complete the circuit upon engagement thereby when the shaft drops downwardly from its set position and shifts the first contact elements to their second state.

7. An inertial switch which is actuated by acceleration resulting from shakes comprising

- a chamber having a generally horizontal shallow upwardly-facing conical surface having a central apex at a lower point thereof;
- a spherical ball urged by gravity to rest in a central disposition on said conical surface,
- a vertical shaft disposed in the chamber aligned with the central apex and above the ball, the shaft being guided for vertical movement in the chamber and having a lower end resting on top of the ball,
- a spring urging the shaft downwardly to a set position against the ball at rest in its central disposition,
- whereby a peak acceleration which exceeds a predetermined magnitude will displace the ball and conical surface relatively horizontally to an extent that the shaft will be urged to drop downwardly from its set position by the spring toward the central apex and thus hold the ball displaced in an offset disposition relative to the central apex of the conical surface, and
- electrical contact elements manifesting a first state when the ball is in the central disposition and shifted to a second state thereby actuating the switch when the ball is displaced to the offset disposition,
- the contact elements being resettable to the first state by externally lifting the shaft against the spring and allowing the ball to return by gravity to the central disposition, and returning the shaft to its set position.

8. An inertial switch according to claim 7 wherein the switch is actuated responsive to a peak acceleration of between about 0.1 to about 10.0 G, which is pre-set in accordance with the conical surface angle from the horizontal, the weight of the ball and force of the spring.

9. An inertial switch according to claim 8 wherein the conical surface angle is about 6 degrees from the horizontal, the ball comprises a 5/16 inch steel ball bearing and spring has a spring rate of about 0.015 #/inch.

10. An inertial switch according to claim 7 wherein the switch is actuated responsive to a peak acceleration of about 0.4 G.

* * * * *